Dec. 27, 1949　　　G. A. GOEPFRICH　　　2,492,628
MULTIPLE VALVE ARRANGEMENT
Filed June 17, 1944　　　　　　　　　　　　2 Sheets-Sheet 1
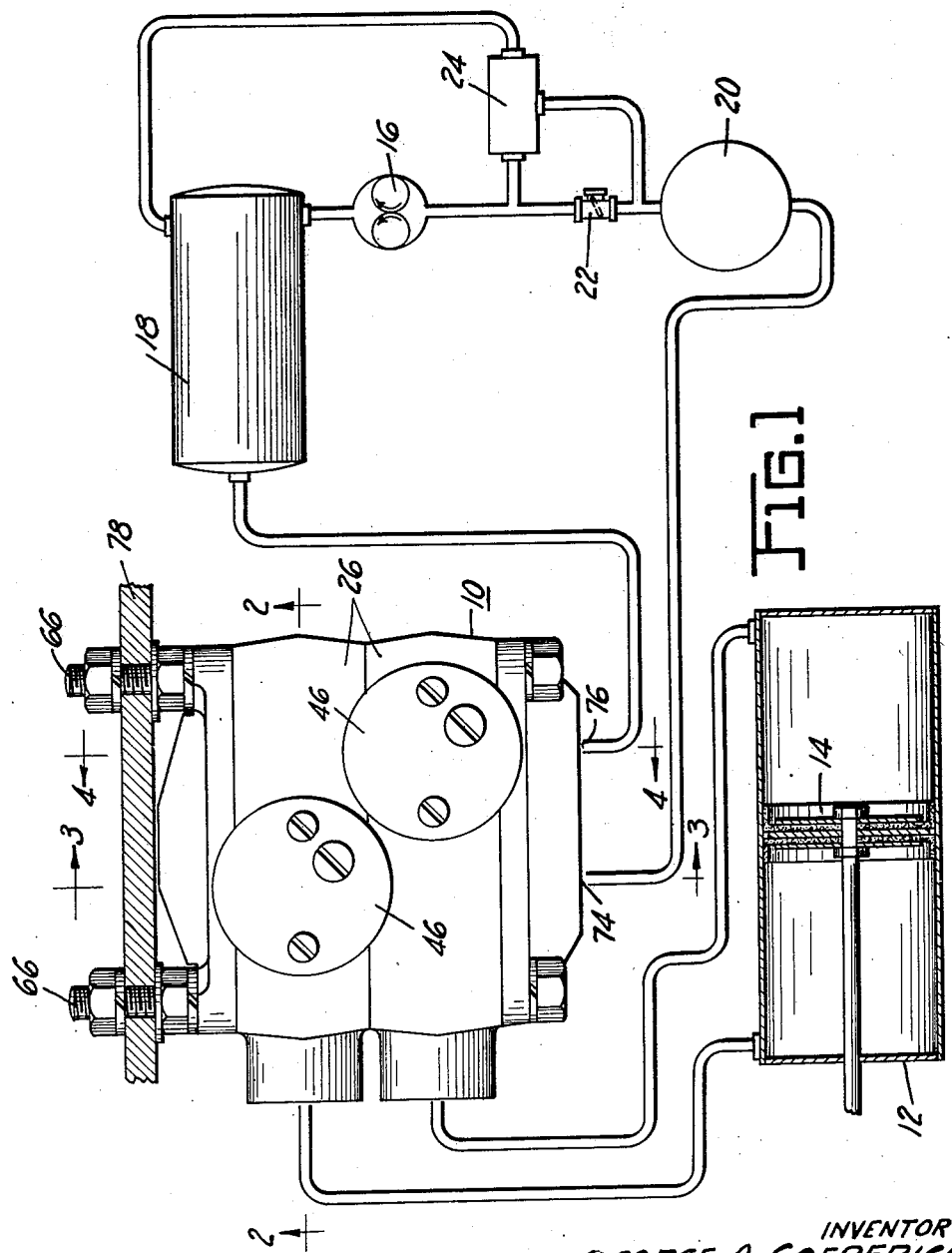
INVENTOR
GEORGE A. GOEPFRICH
BY Cecil D. Arens
ATTORNEY

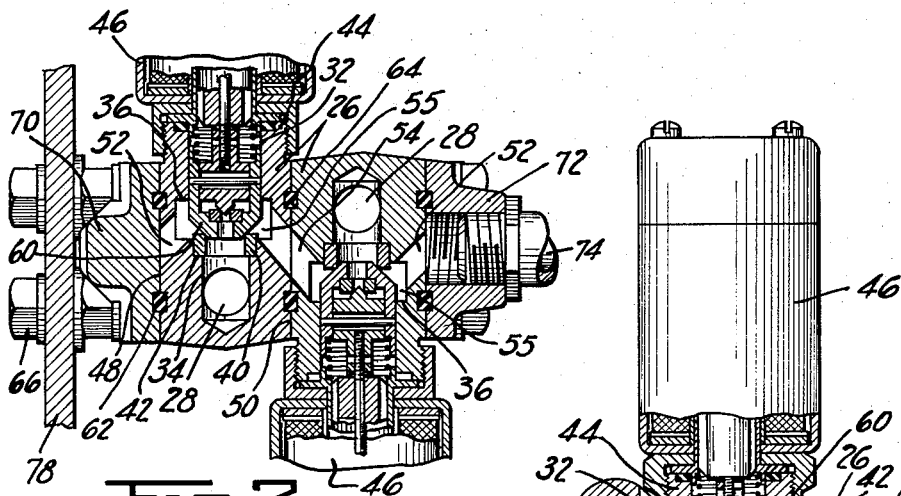

Patented Dec. 27, 1949

2,492,628

UNITED STATES PATENT OFFICE 2,492,628

MULTIPLE VALVE ARRANGEMENT

George A. Goepfrich, South Bend, Ind., assignor to Bendix Aviation Corporation, South Bend, Ind., a corporation of Delaware Application June 17, 1944, Serial No. 540,807

4 Claims. (Cl. 137—144)

This invention relates to valves for use in hydraulic systems and more particularly to valves for use in hydraulic systems on aircraft where it is desirable to reduce valve size to a minimum in order to keep down the weight and yet provide a valve that will withstand pressures above 1,000 p. s. i.

In the average hydraulic system there are usually many valves, each of which is adapted to control the flow of fluid to an appurtenance or instrumentality with which the valve may be associated. The number of valves, of course, depends upon the size of the system and the number of appurtenances associated therewith. In many of the hydraulic systems used on aircraft where the rudders, elevators, ailerons, etc., are all hydraulically operated the weight as well as the space factor required for valves to control these devices may become quite material, and especially so in large aircraft having many hydraulically actuated instrumentalities. Quite often to gain a space advantage the valves are connected side by side to form a multiple valve assembly. This arrangement of valves or assembly also lends itself to a simple means for replacing a valve that has become in disrepair. However, where solenoid controlled valves are to be assembled in juxtaposition with the valve bodies in actual contact, as distinguished from spacing the valves in assembled relation with a conduit connected between them, the conventional type valve necessitates a body portion that is slightly wider than the solenoid associated with the valve so that that solenoid of an associated valve will not interfere with the solenoid of an adjacent valve of the assembly when grouping the valves. There is the objection in the conventional valve that its width is determined by the width of the solenoid associated with the valve. That is, in order for the valves to be joined in assembled relationship the valve body must be at least as wide as the solenoid associated with the valve. The improved valve of this invention is so constructed and arranged as to entirely remove the aforementioned objection. In this discussion a solenoid controlled valve has been used as an example of fluid control means but a valve utilizing any other external control means may have been considered for purposes of exemplification.

It is therefore one of the principal objects of this invention to provide a valve constituted so as to be associated with one or more like valves to form a valve assembly which occupies a minimum of space.

A further object of the invention resides in the provision of a valve controlled by external means associated therewith which is wider than the valve body but which is disposed with respect to its associated valve so as to permit the assembly of a plurality of valves in juxtaposition.

Another object of the invention lies in the provision of a solenoid controlled valve having diametrically disposed solenoids wider than the valve and associated with the valve in offset relationship with respect to each other, whereby the valves may be secured in juxtaposition.

A still further object of the invention is to provide a solenoid valve constituted to be secured to a like solenoid valve to form a multiple valve arrangement so that the solenoid of an associated valve of the valve arrangement extends beyond its associated valve and is staggered with respect to the solenoid of the adjacent valve.

Another important object of the invention is to provide a valve simple of construction, comparatively cheap to manufacture and adaptable for universal application.

Other objects and advantages of the present invention should be readily apparent by reference to the following specification considered in conjunction with the accompanying drawing, but it will be understood that any modifications may be made in the specific structural details thereof within the scope of the appended claims without departing from the spirit of the invention.

In the drawings:

Figure 1 is a schematic illustration of an hydraulic system as applied to hydraulic servo units incorporating the device of this invention in which only two valves have been secured in assembled relationship for a particular application;

Figure 2 is a sectional view of the device of the invention taken on the line 2—2 of Figure 1;

Figure 3 is a sectional view of the invention taken on the line 3—3 of Figure 1; and Figure 4 is a sectional view of the invention taken on the line 4—4 of Figure 1.

Referring now to Figure 1 of the drawings, reference numeral 10 designates generally a valve of this invention connected in an hydraulic system for controlling the fluid flow to a cylinder 12 in which a piston 14 is adapted to reciprocate. A pump 16 receives fluid from a tank 18 and puts the fluid under pressure in an accumulator 20 for supplying hydraulic pressure to the cylinder at times. A check valve 22 prevents the pressure acting on accumulator 20 from backing up into the system. A regulator or unloading valve 24 is connected to the accumulator 20 and is responsive to the pressure on the accumulator to cause the fluid from the pump 16 to be bypassed to tank 18 when the pressure on the accumulator exceeds a predetermined value.

The valve 10 which forms the basis of this invention comprises a valve body 26 drilled at 28 longitudinally of the body and counterbored at 30 for the reception of a conduit connecting the cylinder 12. The body is drilled at 32 and 34 and recessed at 36 and 38. A valve seat 40 is pressed into bore 32 and secured in position against a shoulder 42 formed by bore 34. Protuberances or bosses 44 integral with the body portion are threaded for securing solenoids 46 thereto. As will be noted these solenoids are diametrically disposed 180° around the valve body and offset with respect to each other for a purpose to be hereinafter described.

To facilitate its assembly with a like valve the valve body 26 is provided with smooth parallel sides 48 and 50 which are drilled angularly at 52 and 54 so as to terminate in chamber 55 formed by recess 36 to provide an inlet passage adapted for continuous communication with the accumulator. A second pair of drilled holes 56 and 58 in the sides or walls of the body terminate in a chamber 59 to form an exhaust passage adapted for continuous communication with the supply tank. A valve member 60 actuated by the solenoid 46 is adapted to slide in bore 32 and seat on the valve seat 40 which is secured to the body 26 for sealing the valve against fluid flow between cylinder passage 28 and the inlet passage and chamber 55. Another valve member 60 controlled by a similar solenoid 46 is adapted to seat on an identical seat 40 for sealing the valve against fluid flow between cylinder passage 28 and the exhaust passage and chamber 59. These angularly drilled passages which converge in chambers within the valve to form a pair of passages directly connected to the accumulator and supply tank terminate in the parallel walls or sides of the valve body and form inlet and exhaust ports respectively which are adapted to register with ports of like valves when assembled therewith to form a multiple valve arrangement. Annulated grooves 62 circumscribe the inlet and exhaust ports and are designed to receive a seal 64 for sealing the ports when the valves are connected in assembled relationship as shown in Figures 3 and 4 by passing bolts 66 through openings 68 in the valve body. A cover 70 held tightly against the side wall of the solenoid valve by the bolts 66 blanks off one side of the valve and a cover 72 also held in position by the bolts 66 has openings 74 and 76 therein which register with the inlet and exhaust ports respectively. The valve arrangement may be securely held in place by passing the bolts 66 through a member 78.

It is to be noted that all the valves are of identical construction which is a very important factor in obtaining maximum production and also an advantage in that the supply of replacements on hand may be kept to a minimum since only one type valve is necessary. The valve bodies of the assembly are of a minimum width that is compatible with strength and are constituted so that when in assembled relationship the solenoids of an associated valve extend beyond its own body and over the body portion of an adjacent valve as shown in Figure 1. It can be seen that if another solenoid valve similar to the valve in Figure 2 and having its solenoids diametrically spaced and offset with respect to each other, is placed side by side the valve of Figure 2 as shown for example in Figure 1, the solenoids present a staggered appearance with respect to each other, whereby a plurality of bodies each having solenoids associated therewith wider than its associated valve body may be assembled so that the overall width of the solenoid assembly is less than the overall width of the valve arrangement.

What I claim is:

1. A multiple valve arrangement comprising a plurality of valve bodies connected in juxtaposition and each body having two parallel sides diametrically spaced apart, a pair of independent transverse passages extending through each body and constructed and arranged to terminate in said sides substantially midway thereof so that when corresponding sides of the bodies are contiguous the corresponding passages of adjacent bodies will register, a longitudinal bore in each body intersecting said transverse passages, individual valve means between each transverse passage and the bore associated therewith for controlling flow to and from each bore and the transverse passages associated therewith, the respective corresponding transverse passages in all the bodies coacting to form a pair of continuous independent passages through all the bodies when the bodies are in juxtaposition, and operating means for each valve means, the operating means for the valve means in each body being mounted on said body between its parallel sides in opposing predetermined spaced relationship and having a width greater than the distance between said parallel sides so that when the corresponding sides of said valve bodies are contiguous the operating means associated with any valve body will overlap an adjacent valve body and the operating means extending in the same direction from said valve bodies will be longitudinally spaced from each other.

2. A multiple valve arrangement comprising a plurality of valve bodies connected in juxtaposition and each body having two parallel flat surfaces diametrically spaced apart, a plurality of independent transverse passages extending through each body and constructed and arranged to terminate in said surfaces so that when corresponding surfaces of the bodies are contiguous the corresponding passages of adjacent bodies will register, a bore in each body intersecting said transverse passages, a valve seat located at the intersection of each of the passages with the bore associated therewith, a valve member for each valve seat, the respective corresponding transverse passages in all the bodies coacting to form a pair of continuous independent passages through all the bodies when the bodies are in juxtaposition, and means for each valve member mounted on opposite sides of each of said valve bodies externally thereof and between said parallel surfaces for moving said valve members to thereby control flow to and from each bore and the transverse passages associated therewith, said means for each valve body having portions extending beyond said parallel surfaces of the associated body so that when corresponding surfaces of said valve bodies are contiguous the extending portions overlap adjacent valve bodies and the means extending in the same direction from said valve bodies will be staggered with respect to each other.

3. A multiple valve arrangement comprising a plurality of valve bodies connected in juxtaposition and each body having two parallel flat surfaces diametrically spaced, a longitudinal bore in each body, a plurality of independent transverse passages extending through each body and intersecting said bore, said passages constituted to terminate in the surfaces so that when corresponding surfaces of the bodies are contiguous the corresponding passages of adjacent bodies will register, grooves in the surfaces circumscribing each of said passages, seals constituted to fit into said grooves of adjacent bodies, valve means interposed between the intersection of each of the transverse passages with the bore associated therewith for controlling the flow to and from said bore and the transverse passages, and a device for operating each valve means mounted externally of the body and having portions extending beyond said parallel surfaces of the associated body so that when corresponding surfaces of said valve bodies are contiguous said extending portions of any device will overlie an adjacent valve body.

4. A multiple valve arrangement comprising a plurality of valve bodies connected in juxtaposition and each body having two parallel flat surfaces oppositely spaced, a plurality of independent transverse passages extending through each body and constructed and arranged to terminate in said surfaces so that when corresponding surfaces of the bodies are contiguous the corresponding passages of adjacent bodies register, a bore in each body interconnected with each of said transverse passages in its associated body, and control means for each body for controlling flow to and from each bore and the transverse passages associated therewith and including solenoids mounted externally of said body and between said parallel surfaces in opposing predetermined spaced relationship and having portions extending beyond said surfaces of its associated body so that when corresponding surfaces are contiguous said extending portions of any solenoid will overlap an adjacent valve body.

GEORGE A. GOEPFRICH.

REFERENCES CITED

The following references are of record in the file of this patent:

UNITED STATES PATENTS

| Number | Name | Date |
| --- | --- | --- |
| 1,684,033 | Josephs | Sept. 11, 1928 |
| 1,722,920 | Hynes | July 30, 1929 |
| 1,786,402 | Russell | Dec. 23, 1930 |
| 2,057,088 | DeMillar | Oct. 13, 1936 |
| 2,238,768 | Berglund | Apr. 15, 1941 |
| 2,289,567 | Berglund | July 14, 1942 |
| 2,339,353 | Ray | Jan. 18, 1944 |